UNITED STATES PATENT OFFICE.

ALBERT EDVARD JENS VALDEMAR JOHAN THEILGAARD, OF COPENHAGEN, DENMARK.

PROCESS OF DEVULCANIZING CAOUTCHOUC, INDIA-RUBBER, &c.

SPECIFICATION forming part of Letters Patent No. 638,775, dated December 12, 1899.

Application filed May 2, 1899. Serial No. 715,356. (No specimens.)

*To all whom it may concern:*

Be it known that I, ALBERT EDVARD JENS VALDEMAR JOHAN THEILGAARD, chemist, of 30 Wiederveltsgade, Copenhagen, in the Kingdom of Denmark, have invented a certain new and useful Improvement in the Process of Devulcanizing Caoutchouc, India-Rubber, Gum-Elastic, and Similar Materials, of which the following is a specification.

The object of the present invention is a process of devulcanizing caoutchouc, india-rubber, gum-elastic, and similar materials; and it consists in subjecting the vulcanized material to a treatment with a solution of a sulfite which is able to remove sulfur as well as oxygen. The sulfites are able to do this, and they are easily regenerated by simple and well-known processes.

The following is an example of the above-mentioned process: Vulcanized caoutchouc divided into pieces of a suitable size is placed in a recipient adapted for the purpose and is therein treated with a solution of sulfite of soda, ($Na_2SO_3$,) the amount of the sulfite being in proportion to the amount of sulfur contained in the material subjected to the treatment. The action of the sulfite in removing the sulfur or the chemical process which takes place may be expressed by the following equation: $Na_2SO_3 + S = Na_2S_2O_3$.

In order to accelerate the process, the temperature may be raised by means of direct or indirect steam.

When the devulcanization is finished, the solution is removed and the material is washed and carefully dried. The devulcanized caoutchouc can now be formed into new articles and again be vulcanized.

What I claim as my invention, and desire to secure by patent, is—

1. The herein-described process of devulcanizing vulcanized india-rubber, caoutchouc and similar gums, the same consisting in reducing the vulcanized material to pieces of suitable size, then subjecting such material to a solution of a sulfite, and then washing the devulcanized material.

2. The herein-described process of devulcanizing vulcanized india-rubber, caoutchouc and similar gums, the same consisting in reducing the vulcanized material to pieces of suitable size, then subjecting such material to a solution of a sulfite, under the influence of heat, and then washing the devulcanized material.

Signed at Copenhagen, Denmark, this 14th day of April, 1899.

ALBERT EDVARD JENS VALDEMAR JOHAN THEILGAARD.

Witnesses:
HOFMAN BANG,
JULES BLOM.